United States Patent [19]

Watanabe et al.

[11] 4,352,462
[45] Oct. 5, 1982

[54] SPRAY NOZZLE

[75] Inventors: Masaru Watanabe, Fuchu; Takayoshi Amada, Yokohama; Shinichi Yamaguchi, Tomioka, all of Japan

[73] Assignee: Tokyo Shibaura Denki Kabushiki Kaisha, Kanagawa, Japan

[21] Appl. No.: 184,981

[22] Filed: Sep. 8, 1980

[30] Foreign Application Priority Data

Sep. 10, 1979 [JP] Japan .................................. 54-115164
Nov. 30, 1979 [JP] Japan .................................. 54-155263

[51] Int. Cl.³ ................................................ B05B 1/32
[52] U.S. Cl. .................................... 239/266; 239/453; 239/456
[58] Field of Search ............... 239/266, 452, 453, 456; 134/169 R, 178

[56] References Cited

U.S. PATENT DOCUMENTS 3,662,781  5/1972  Figliola ............................. 239/453
4,181,144  1/1980  Landen ............................. 239/453

FOREIGN PATENT DOCUMENTS 49-56217  5/1974  Japan .

Primary Examiner—James B. Marbert
Attorney, Agent, or Firm—Stevens, Davis, Miller & Mosher

[57] ABSTRACT

In a spray nozzle including a nozzle structure having an internal chamber and an injecting hole provided through the nozzle structure at an outer end thereof, a control rod is provided in the internal chamber so that the outer end of the control rod projects outwardly through said injecting hole. A planar disc-shaped member is secured to the inner end of the control rod for defining a movable range in the axial direction of the same rod. A spring member is provided around the same rod for urging the rod inwardly, and a nozzle-tip member is secured to the outer end of the control rod for closing the injecting hole from outside. An apparatus utilizing the spray nozzle is further disclosed.

11 Claims, 7 Drawing Figures

4,352,462

SPRAY NOZZLE

BACKGROUND OF THE INVENTION

This invention relates to a spray nozzle capable of preventing sludge intrusion therein even in a case where the spray nozzle is placed within a sludge substance. This invention also relates to an apparatus in which spray nozzles of this kind are utilized.

Heretofore, spray nozzles have been widely used for spraying a liquid substance over an article for cleaning or cooling the article or for depositing and drying the substance on the surface of the article. However, since most of the conventional spray nozzles have no reverse-flow preventing mechanism, when the nozzle 1 is placed in a sludge 3 contained in a vessel 2 as shown in FIG. 1 of the accompanying drawings, some part of the sludge inevitably intrudes inside of the spray nozzle, thus causing deposition of the sludge and clogging of the liquid passage in the spray nozzle.

A specific type of conventional spray nozzles includes a reverse flow preventing mechanism as shown in FIG. 2, the nozzle comprising a stem part 5 having a liquid passage 6 therein, a nozzle cap member 13 having an injecting hole, 4, the stem part 5 and the nozzle cap member 13 defining a chamber 7 having a larger diameter than that of the fluid passage 6, and a spherical valve member 9 encased in the chamber 7 so as to be urged by a spring 8 toward the passage 6 opening in the chamber 7.

It is apparent, however, that the conventional spray nozzle of the above described construction cannot prevent the sludge from intruding into the chamber 7 through the injecting hole 4 when the spray nozzle is placed in the sludge. A part of the sludge intruded in the chamber 7 tends to be solidified and compacted by the reciprocating movement of the spherical valve member 9, so that the interior of the chamber 7 and injecting hole 4 are clogged by the compacted sludge.

SUMMARY OF THE INVENTION

It is a primary object of the present invention to provide a spray nozzle wherein the above described difficulty of the conventional spray nozzle can be substantially eliminated.

Another object of the invention is to provide a spray nozzle wherein the injecting hole of the same nozzle is automatically closed when no fluid is injected out of the spray nozzle, thereby eliminating any possibility of the sludge substance intruding inside of the spray nozzle.

Still another object of the invention is to provide a spray nozzle wherein a nozzle tip member is provided for closing the injecting hole of the spray nozzle from outside upon interruption of the fluid supply, whereby any intrusion of sludge into the spraying nozzle can be substantially eliminated.

Still another object of the present invention is to provide a sludge delivery transferring apparatus wherein the spray nozzle is provided at an end of a valve washing mechanism provided for each of sludge delivery transferring valves.

According to one aspect of the present invention, there is provided a spray nozzle comprising a nozzle structure having an internal chamber and an injecting hole provided at an outer end of the nozzle structure in communication with the internal chamber, a control rod provided in said internal chamber and having an outer end projecting outwardly through said injecting hole, a planar member secured to the inner end of said control rod for defining a movable range in axial direction of said control rod, a spring member provided in said internal chamber for urging said control rod inwardly of said chamber, and a nozzle tip member secured to the outer end of said control rod for closing the injecting hole from outside.

In another aspect of the present invention, there is provided a sludge delivery transferring apparatus comprising:

a valve box having at least one inlet port provided through the peripheral wall and a number of outlet ports provided through the bottom wall of the valve box, a cover being detachably secured to the top of said peripheral wall;

valve spindles extending through said cover at positions vertically aligning with said outlet ports;

valve driving mechanisms each having a driving member operative to drive said valve spindle vertically;

valve bodies provided at the lower ends of said valve spindles, respectively;

valve seats formed around said outlet ports; and valve washing mechanisms incorporated with said valve bodies and said valve spindles, and each including a spray nozzle provided at an end of said valve body.

The invention will be described with reference to FIGS. 3 to 6 of the accompanying drawings wherein like parts are designated by like reference numerals.

DESCRIPTION OF THE PREFERRED EMBODIMENTS

Figure 1:
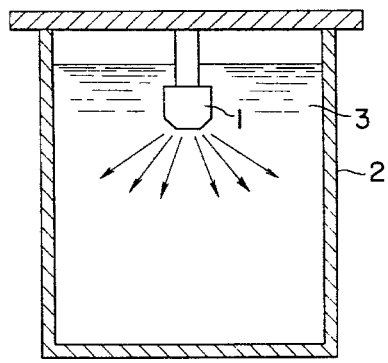
FIGS. 1 and 2 are diagrams for explaining a usage of a spray nozzle and a construction of a conventional spray nozzle.
Figure 2:
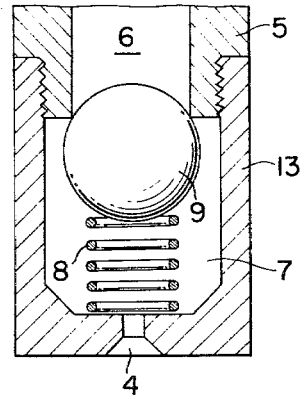
Figure 3:
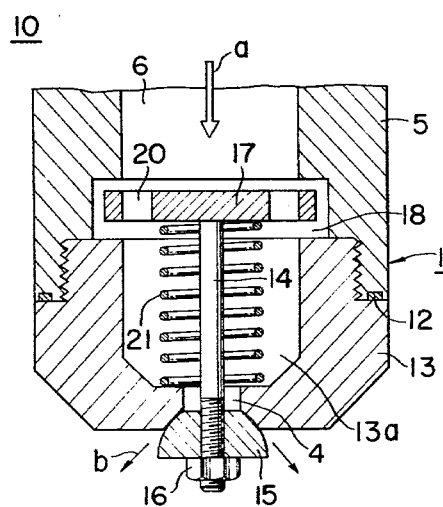
FIG. 3 is a longitudinal sectional view of an embodiment of the spray nozzle according to the present invention.

Referring now to FIG. 3, a spray nozzle 10 constituting a preferred embodiment of the present invention includes a main structure generally designated at 11, which comprises a stem member 5 having an internal fluid passage 6, and a nozzle cap member 13 having an internal space 13a and secured, in thread engagement, to the stem member 5 with a packing 12 interposed therebetween. An injecting hole 4 counter-sunk to spread outwardly is provided through the bottom wall of the cap member 13 at a central part thereof. A control rod 14 is provided internally of the cap member 13 so that the outer end of the control rod 14 projects outwardly through the injecting hole 4. A semi-spherical nozzle-tip member 15 is secured to the control rod 14 at a position adjustable along the length of the control rod 14. Preferably, the projecting part of the control rod 14 may be screw-threaded, and the nozzle-tip member 15 may be secured to an adjustable position by a nut 16.

The control rod 14 is at its internal end secured perpendicularly to the central part of a preferably circular disc-shaped member 17. On the other hand, an increased diameter portion 18 is formed in the internal space 13a of the nozzle cap member 13 at a part adjacent to the lower end of the stem member 5, and the disc-shaped member 17 is received in the increased diameter portion 18. Since the thickness t of the disc-shaped member 17 is selected to be substantially smaller than the axial length of the increased diameter portion 18, the disc-shaped member 17 is axially movable in the increased diameter portion 18, and the movable range of the axial movement of the disc-shaped member 17 and hence the control rod 14 secured thereto is defined by the lower end of the stem member 5 and an annular surface defining the lower extremity of the increased diameter portion 18.

A number of holes 20 are provided through the disc-shaped member 17 concentrically at positions equally spaced apart circumferentially, so that the fluid supplied to th spray nozzle can pass through the holes 20 toward the injecting hole 4.

A spring 21 of a coil shape is provided in the internal space 13a of the nozzle cap member 13 so that the coil spring 21 extends around the control rod 14 from the bottom of the internal space 13a to the lower surface of the disc-shaped member 17.

The spray nozzle 10 of the above described construction operates as follows.

In the non-operative state, the control rod 14 is urged by the spring 21 so that the nozzle tip member 15 secured to the outer end of the control rod 14 is brought into tight engagement with the counter-sunk part of the injecting hole 4. That is, the injecting hole 4 of the spray nozzle is closed from outside by the nozzle tip member 15.

For this reason, even if the spray nozzle is placed in a sludge as described above, any possibility of the sludge intruding inside of the spray nozzle 10 can be substantially eliminated.

When the spray nozzle is operated, a liquid to be sprayed by the spray nozzle is supplied under a pressure into the nozzle structure 11 as indicated by an arrow a. The liquid thus supplied passes through the holes 20 provided through the disc-shaped member 17 into the internal space 13a of the nozzle cap member 13, and exerts a pressure to a part of the nozzle tip member 15 exposed to the interior of the nozzle cap member 13. The nozzle tip member 15 is thus moved outwardly against the force of the spring 21 until the disc-shaped member 17 abuts against the annular surface defining the lower extremity of the increased diameter portion 18.

As a result, an annular gap is formed between the nozzle-tip member 15 and the periphery of the injecting hole 4, and the liquid is sprayed through the gap in a conical manner in a direction indicated by an arrow b in FIG. 3 for the achievement of a desired object.

During the above described operation, even if an amount of sludge be sticking to the surfaces of the injecting hole 4 and the nozzle tip member 15, this can be washed out by the liquid forced out of the spray nozzle. In other words, the spray nozzle of this invention has a self-cleaning capability.

The adjustment of the annular gap, through which the liquid is sprayed, can be realized by adjusting the position of the nut 16 along the control rod 14 in accordance with the requirement for the spray nozzle.

Figure 4:
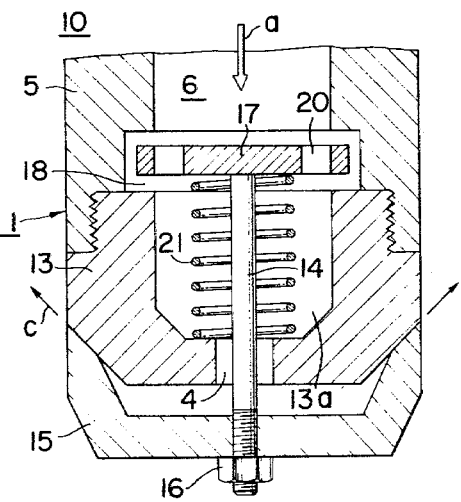
FIG. 4 is a longitudinal sectional view of another embodiment of the present invention.

In FIG. 4 is indicated another embodiment of the spray nozzle 10 wherein the nozzle-tip member 15 is formed into a cup-like configuration opening toward the nozzle structure 11, so that the edge portion of the cup-like nozzle-tip member 15 is brought into engagement with the outer peripheral surface of the nozzle-cap member 13 at the tip thereof. By the above described configuration of the nozzle-tip member 15, the spraying direction of the liquid to be sprayed by this embodiment of the invention can be disposed radially of the nozzle structure 11 or obliquely backwardly as indicated by an arrow c in FIG. 4.

According to the present invention, since the nozzle-tip member 15 is provided to close the injecting hole 4 of the spray nozzle from outside of the nozzle structure, any possibility of sludge intruding inside of the nozzle structure through the injecting hole can be eliminated even in a case where the spray nozzle 10 is placed in the sludge, and the hereinbefore described drawback of sludge intruding inside and clogging the spray nozzle can be thereby substantially obviated. Even in a case where sludge intrudes inside of the spray nozzle through the gap between the hole edge and the nozzle tip member so as to stick thereto, subsequent operations of the spray nozzle will wash out the sticking sludge without fail. In other words, the spray nozzle of this invention exhibits a self-cleaning effect.

Furthermore, because of the construction of the spray nozzle wherein the nozzle tip member 15 is secured to the the control rod 14 at an adjustable position outside of the nozzle structure, the magnitude of the annular gap through which the liquid is sprayed, can be adjusted as desired, thus enabling to control the sprayed quantity of the the liquid per unit time.

Since the nozzle-tip member 15 has been provided outside of the nozzle structure, the position at which the flow of the liquid is blocked can be selected arbitrarily, and by selecting the shape and the like of the nozzle tip member suitably, the liquid can be sprayed in any desired direction.

Figure 6:
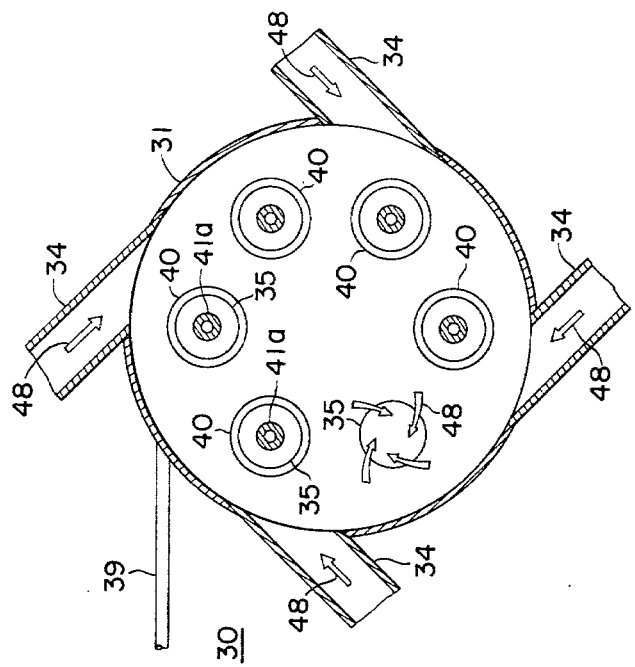
FIG. 6 is a cross-sectional view of the same apparatus taken along the line VI—VI in FIG. 5.
Figure 5:
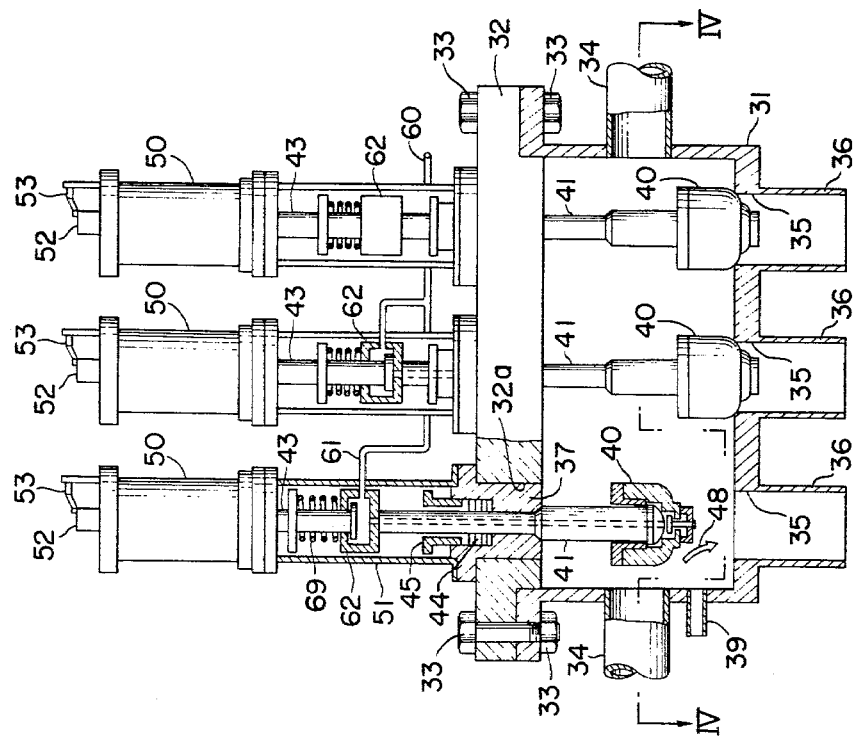
FIG. 5 is an elevational view, partly sectioned, of a sludge-like fluid transferring apparatus wherein the spray nozzle according to the present invention is utilized.

In FIGS. 5 and 6, there is illustrated a sludge delivery transferring apparatus wherein the spray nozzle of FIG. 4 is utilized. The apparatus includes a valve box 30 comprising a shallow cylindrical casing 31 opening upwardly and a cover 32 detachably secured to the cylindrical casing 31 by means of bolts and nuts 33.

A number of inlet pipes 34 each extending from, for instance, a sludge processing device (not shown), are provided through the circumferential wall of the cylindrical casing 31 as shown in FIG. 6. Furthermore, a pipe 39 is provided through the circumferential wall of the casing 31 for cleaning the interior of the valve box 30.

Figure 7:
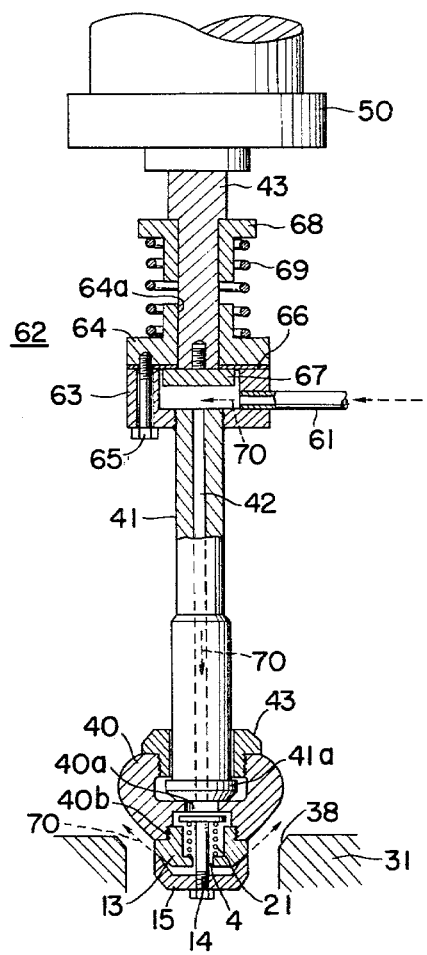
FIG. 7 shows a transferring valve used in FIG. 6.

Through the bottom wall of the cylindrical casing 31, a number of holes 35 are provided concentrically in an equally spaced apart relation, and are connected with a corresponding number of outlet pipes 36 respectively. Each hole 35 is provided with a valve seat 38 (as shown in FIG. 7).

A number of sludge delivery transferring valves, each comprising a valve body 40, valve spindle 41, and a driving cylinder 50 for driving the valve body 40 toward or away from the valve seat 38, are provided in the valve box 30 for controlling the delivery of the sludge supplied into the valve box 30 outwardly through the outlet pipes 36. More specifically, holes 32a are provided through the cover 32 of the valve box 30 at positions vertically aligning with the holes 35 of the cylindrical casing 31, and bushes 37 are forced into the holes 32a in a liquid-tight manner. To the upper surface of each bush 37 is secured a supporting member 51 that supports the driving cylinder 50 at the upper end thereof.

The valve body 40 is secured to a lowermost end 41a of the valve spindle 41, having a greater diameter than that of the valve spindle 41, by means of a valve securing member 43.

The valve spindle 41 passing upwardly through the bush 37 forced into the cover 32, extends to the driving cylinder 50 supported by the supporting member 51 as described above. A packing 44 and a packing gland 45 are provided for preventing sludge from leaking out of the valve box 30 through a gap between the valve spindle 41 and the bush 37.

Furthermore, a striker 52 connected to a piston (not shown) in the driving cylinder 50 is provided on the upper end of the driving cylinder 50 for operating a limit switch 53.

For the purpose of preventing sludge from sticking to and depositing on the surfaces of the valve body 40 and the valve seat 38, a valve washing device is incorporated with each of the sludge delivery transferring valves.

As a part of the valve washing device, a cleaning water supplying passage 42 is provided internally throughout the length of the valve spindle 41, and a casing or socket, generally designated at 62, is secured to the upper end of the valve spindle 41 as shown in FIG. 7. The casing 62 comprises a cup-shaped lower member 63 water-tightly secured to the valve spindle 41, and a cover member 64 secured to the cup-shaped member 63 by means of machine screws 65 with a packing 66 interposed between the two members 63 and 64. The cover member 64 is centrally provided with a hole 64a, through which is extending slidably a driving shaft 43 connected with a piston (not shown) in the driving cylinder 50. A coil spring 69 is provided between the cover member 64 and a member 68 secured to the driving shaft 43.

Internally of the casing or socket 62, a valve member 67 is provided freely movably, and is secured to the lower end of the driving shaft 43. A cleaning water supplying pipe 61 connected with a cleaning water-header 60 shown in FIG. 5 is led into the casing 62.

The valve body 40 is internally provided with a central hole 40a and a cylindrical recess 40b communicated with each other and a screw thread is formed internally of the peripheral surface of the cylindrical recess 40b.

A spray nozzle 10 as shown in FIG. 4 and comprising a nozzle cap member 13 with an injecting hole 4 provided through the bottom wall, a control rod 14 partly projecting outwardly through the injecting hole 4, a nozzle tip member 15 adjustably secured to the outer end of the control rod 14 by means of a nut 16, a disc-shaped member 17 having a plurality of liquid passages 20 and secured to the innermost end of the control rod 14, and a coil spring 21 is secured to the valve body 40 with its nozzle cap member 13 in thread engagement with the cylindrical recess 40b of the valve body 40.

The operation of the sludge delivery transferring apparatus having a valve washing device will now be described in detail.

Sludges processed, for instance, in sludge processing devices (not shown) are introduced through the inlet pipes 34 in the valve box 30. When any of the sludge delivery transferring valves is operated by the valve driving cylinder 50, the valve body 40 of the valve is lifted upward from the valve seat 38, so that the sludge in the valve box 30 is allowed to flow through the corresponding outlet pipe 36 toward a desired position.

For preventing sludge from sticking to the valve body 40 and the valve seat 38 and hampering the operation of these valves, the valve washing device is operated simultaneously with the operation of the sludge delivery transferring apparatus.

That is, cleaning water is supplied, under pressure, through the heater 60 and the cleaning water supplying pipes 61 to the casings 62 of the transferring valves. When any one of the valves is operated upward opening the valve, the driving shaft 43 of the driving cylinder 50 is lifted raising the valve member 67 in the casing 62, attached to the lower end of the driving shaft 43 upwardly. The cleaning water supplied into the casing 62 is thus permitted to flow through the cleaning water supplying passage 42 provided through the length of the valve spindle 41, and through the central hole 40a of the valve body 40 to the interior 13a of the nozzle cap member 13 of the spray nozzle 10.

The pressurized water supplied into the spray nozzle 10 then depresses the valve tip member 15 outwardly against the force of the spring 21 until a predetermined gap distance is obtained, thereby allowing the cleaning water to flow through the gap between the valve tip member 15 and the outer peripheral surface of the nozzle cap member 13 in a direction indicated by an arrow 70 in FIG. 7. Cleaning water is thus injected through the gap in a conical shape initially along the surfaces of the valve body 40 and the valve seat 38, the later solely along the surface of the valve body 40, thereby cleaning these surfaces against the collection of the sludge deposite.

When the transferring valve is operated downwardly by the valve driving cylinder 50 until the valve body 40 is brought into the proximity of the valve seat 38, the same seat 38 is further washed by the cleaning water injected from the spray nozzle 10. After the valve body 40 touches the valve seat 38 to close the same, the valve driving shaft 43 still moves downwardly against the force of the spring 69 until the valve member 67 closes the passage 42 and interrupts the injection of the cleaning water from the spray nozzle 10. Upon interruption of the cleaning water, the nozzle tip member 15, control rod 14, and the disc-shaped member 17 are raised upward by the force of the spring 21, so that the nozzle tip member 15 closes the injection hole 4 from outside. The closure of the injection hole 4 from outside prevents the sludge in the valve box 30 from intruding inside of the spray nozzle 10, and the hereinbefore described drawback of the sludge intruding inside of the spray nozzle and clogging the passage therein for the cleaning water can be substantially eliminated.

In a case where it is desired to interrupt the delivery of the pressurized cleaning water during the opening state where the valve body 40 is raised in excess of a predetermined level, means for blocking the supply of the cleaning water automatically in response to the elevation of the valve body 40 may be provided in the cleaning water supplying pipe 61 or else. By the provision of such means, the spray nozzle 10 on the valve body 40 can be closed from outside by the nozzle tip member 15 regardless of the opening state of the valve mechanism, and the possibility of the sludge intrusion is further eliminated while saving the delivery of the cleaning water.

We claim:

1. In a spray nozzle comprising a nozzle structure having an internal chamber and an injecting hole provided at an outer end of the nozzle structure in communication with the internal chamber, a control rod provided in said internal chamber with an outer end thereof projecting outwardly through said injecting hole, a spring member provided in said internal chamber for urging said control rod inwardly in said chamber, and a nozzle tip member secured to the outer end of said control rod for closing the injecting hole from outside, the improvement wherein:
   said nozzle structure comprises a stem member and a nozzle cap member detachably secured to said stem member so as to define said internal chamber within the two members;
   said two members further define an increased diameter portion upwardly and downwardly delimited by annular surfaces extending transversely to said internal chamber;
   a planar member having a diameter larger than that of the internal chamber is encased in said increased diameter portion so that said planar member is movable longitudinally in said increased diameter portion;
   said planar member has a number of fluid passages formed therethrough and is secured perpendicularly to an upper end of said control rod extending longitudinally in said internal chamber;
   said spring member is provided around said control rod between said planar member and a bottom surface of said internal chamber;
   said control rod has a screw threaded portion at the outer end projecting outwardly through said injecting hole; and
   means engageable with said screw-threaded portion of said control rod is further provided for securing said nozzle tip member to a desired portion of said control rod.

2. A sludge delivery transferring apparatus comprising:
   a valve box having a plurality of inlet ports provided through the peripheral wall and a number of outlet ports provided through the bottom wall of the valve box, a cover being detachably secured to the top of said peripheral wall;
   valve spindles extending through said cover at positions vertically aligning with said outlet ports;
   valve driving mechanisms each having a driving member operative to drive said valve spindle vertically;
   valve bodies provided at the lower ends of said valve spindles, respectively;
   valve seats formed around said outlet ports; and
   valve washing mechanisms incorporated with said valve bodies and said valve spindles, and each including a spray nozzle provided at an end of said valve body.

3. A sludge delivery transferring apparatus as set forth in claim 2 wherein each of said valve washing mechanism comprises:
   a cleaning water supplying source;
   an intermediate casing secured to an upper end of said valve spindle for receiving cleaning water supplied from said supplying source;
   said intermediate casing further receiving said driving member of said valve driving mechanism vertically slidably;
   a valve member provided in said intermediate casing to be secured to a lower end of said driving member;
   a spring member provided between said intermediate casing and said driving member for urging the driving member upwardly;
   passage means provided internally through said valve spindle and said valve body to flow said cleaning water toward a lower end of said valve body;
   said driving member forcing the valve member toward the upper end of the valve spindle against a force of said spring member for interrupting the flow of the cleaning water through said passage means when said valve body abuts against said valve seat; and
   a spray nozzle secured to a lower end of said valve body for spraying said cleaning water toward said valve body and said valve seat, so that the valve body and the valve seat are washed out of sludge deposition.

4. A spray nozzle for spraying fluid under pressure comprising:
   means forming a housing having an internal chamber, an inlet and outlet, said internal chamber comprising an engagement chamber, said engagement chamber including a first engagement surface;
   closure means for substantially closing said outlet, said closure means being movable between a closed position and an open position;
   planar means for engaging said first engagement surface positioned within said engagement chamber and capable of movement therein;
   rod means for connecting said closure means to said planar means such that said planar means abuts said first engagement surface when said closure means is in said open position;
   means for biasing said closure member in a closed position such that said inlet is substantially closed by said closure means;
   whereby when fluid under pressure enters said internal chamber through said inlet, the fluid pressure will counter the biasing force of said biasing means and said closure means will move outwardly to allow fluid to escape through said outlet responsive to the pressure until said planar means abuts said first engagement surface when said closure means is in said open position such that the outward movement of said closure means is restricted by said first engagement surface.

5. The spray nozzle of claim 4 wherein said housing comprises first and second members having means for securing said first and second members together.

6. The spray nozzle of claim 5 wherein said first member comprises said outlet and said first engagement surface and said second member comprises a second engagement surface and said planar means is movably positioned between said first and second engagement surfaces.

7. The spray nozzle of claim 4 wherein said closure means comprises securing means for providing adjustment of said closure means relative to said rod means so as to provide adjustment of the magnitude of the opening between said closure means and said outlet when said closure means is in said open position.

8. The spray nozzle of claim 3 wherein said rod means is threaded and said securing means comprises a threaded nut.

9. The spray nozzle of claim 4, 6 or 7 wherein said biasing means comprises a spring extending around said rod means which abuts said planar means and a portion of the surface of said internal chamber adjacent said outlet.

10. The spray nozzle of claim 4, 6 or 7 wherein said planar means comprises a disc-shaped member having holes therein for passage of fluid, said disc-shaped member being secured to said rod means.

11. The spray nozzle of claim 4, 6, 7 or 8 wherein said housing means is connected to a valve spindle which is movable between a first position in which said housing is adapted to close a hole having a valve seat and a second position in which passage of fluid through the hole is permitted.

* * * * *